F. N. MITCHELL.
Agricultural-Boiler.
No. 161,260.            Patented March 23, 1875.
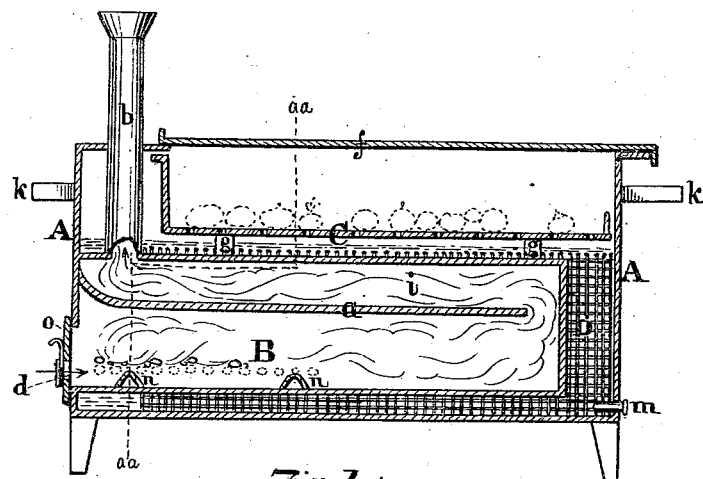
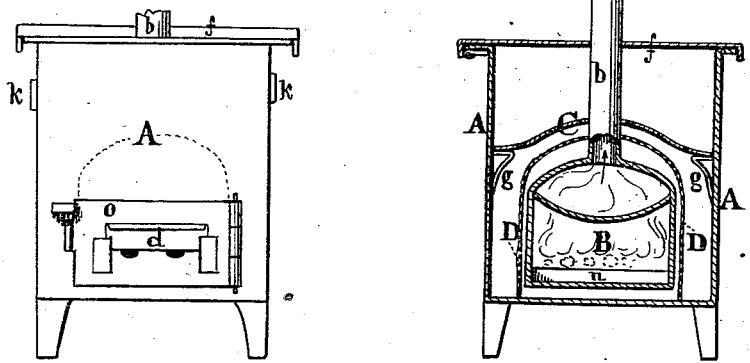

UNITED STATES PATENT OFFICE.

FREDERICK N. MITCHELL, OF EL PASO, ILLINOIS.

IMPROVEMENT IN AGRICULTURAL BOILERS.

Specification forming part of Letters Patent No. 161,260, dated March 23, 1875; application filed February 13, 1875.

*To all whom it may concern:*

Be it known that I, FREDERICK N. MITCHELL, of El Paso, in the county of Woodford, in the State of Illinois, have invented an Improvement in Agricultural Boilers, being a convertible food-boiler and steamer; and do hereby declare that the following is a full, clear, and exact description thereof, reference being had to the annexed drawings making a part of this specification, in which—

Like letters of reference refer to like parts, and in which—

Figure 1 represents a longitudinal sectional elevation through the center of the furnace and boiler; Fig. 2, front elevation; Fig. 3, a cross vertical section on dotted line *a a a a*, Fig. 1.

The objection of this invention is to economise all the heat possible from the furnace in heating water for cooking or steaming food for cattle, &c., at the same time to make the apparatus as compact as possible. To do this the furnace B and flue are entirely inclosed in the food-boiler, and consequently surrounded with water at top, bottom, sides, and one end, leaving the fire-door *o* accessible at one end of the boiler, and providing a return flue, *i*, for the flame, heat, &c. Above the water is placed a removable shelf, C, to receive the larger kind of food or vegetables to be steamed, and the whole is provided with a tight cover, *f*.

In the drawings, A represents the inclosing boiler, galvanized within or otherwise rendered incorrodible, having parallel sides, top, and bottom, and ends, and a hinged cover, *f*, on the top. C is the perforated steaming-shelf, which rests upon cleats *g g* and fixed to the sides of the boiler A. Hot water or mashes, &c., may be run out through the plug-hole *m*. D represents a wire-screen or perforated plate arching over the sides and top of the furnace B and its flue to prevent the contact of the food with the flue or the fire surfaces. B represents the furnace placed entirely within the boiler, its ash-bed or bottom being distinct from that of the boiler, leaving a space between them for the circulation of water, the same as is the case with the sides, top, and inner end, these presenting their surfaces to the body of water. The plate *a* above the fire or furnace proper conducts the heat, smoke, &c., to the back, where the same returns to the chimney *b* along the flue *i*. The door *o* is provided as is common with a draft-regulator, *d*. Four handles, *k*, serve to lift the boiler from place to place when desired.

The operation of this food-boiler and steamer needs little description. The food is placed in the water, which entirely surrounds and also must cover the furnace. Such food as mashes, &c., can be let out through the plug *m*, while the larger food, as potatoes, turnips, &c., may be steamed upon the shelf C. The furnace being thus surrounded by water confers all the advantage possible in quick and economical heating compatible with this construction.

What I claim as my invention is—

The combination of the furnace B, with usual horizontal return flue *i*, the boiler A, screen D, and shelf C, as described.

In testimony that I claim the foregoing boiler and steamer I have hereunto set my hand this 1st day of February, 1875.

FREDERICK N. MITCHELL.

Witnesses:
JOHN CANNON,
JAMES M. MORSE.